United States Patent [19]

Jonsson et al.

[11] Patent Number: 4,555,218
[45] Date of Patent: Nov. 26, 1985

[54] TURBO MACHINE OF THE ROTODYNAMIC TYPE

[75] Inventors: Arne Jonsson, Hagfors; Sigurd Nyman, Eksharad; Eskil K. Olelind, Sundbyberg; Björn Olofsson, Märsta, all of Sweden

[73] Assignee: Jonsson Pumpkonsult, Hagfors, Sweden

[21] Appl. No.: 610,294

[22] PCT Filed: Oct. 4, 1983

[86] PCT No.: PCT/SE83/00347
§ 371 Date: Apr. 30, 1984
§ 102(e) Date: Apr. 30, 1984

[87] PCT Pub. No.: WO84/01406
PCT Pub. Date: Apr. 12, 1984

[30] Foreign Application Priority Data

Oct. 6, 1982 [SE] Sweden .................................. 8205692

[51] Int. Cl.[4] .............................................. F03D 3/04
[52] U.S. Cl. ........................................ 416/17; 416/119
[58] Field of Search ................ 416/17, 111, 117, 119, 416/108, 112 A

[56] References Cited

U.S. PATENT DOCUMENTS

| | | | |
|---|---|---|---|
| 1,753,252 | 4/1930 | Strandgren | 416/108 |
| 1,775,593 | 9/1930 | Kahn | 416/108 |
| 1,835,018 | 12/1931 | Darrieus | 416/111 X |
| 3,912,937 | 10/1975 | Lesser | 416/119 X |
| 3,973,864 | 8/1976 | Atherton | 416/119 X |
| 4,151,424 | 4/1979 | Bailey | 416/111 X |
| 4,315,713 | 2/1982 | Verplanke | 416/117 X |

FOREIGN PATENT DOCUMENTS 2952657  7/1981  Fed. Rep. of Germany ...... 416/117

*Primary Examiner*—Everette A. Powell, Jr.
*Attorney, Agent, or Firm*—Karl F. Ross; Herbert Dubno

[57] ABSTRACT

In a rotodynamic cross flow machine at least one vane (4) is positionably fixed in the rotor (40') so as to be able to pivot about two axes which are at least approximately perpendicular one to another, and of which at least one subtends an angle between 5° and 85° or between 95° and 175° with a plane comprising the rotational axis (1) of the rotor and the pivot point (14, 15) of the respective vane. Thereby is achieved, among other things, that the position of the vane can be set during operation in a simple way with the aid of a stationary setting means (18) which changes the inclination of an end element (5) of the rotor to which end element the vane is connected in said manner. The invention is applicable among other things to the construction of water turbines which have to work with a small head.

11 Claims, 9 Drawing Figures

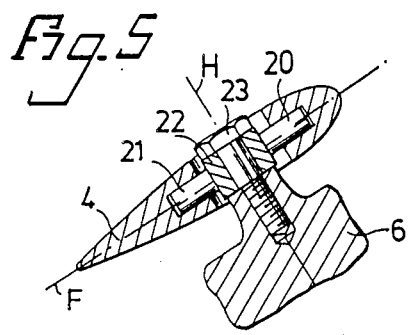
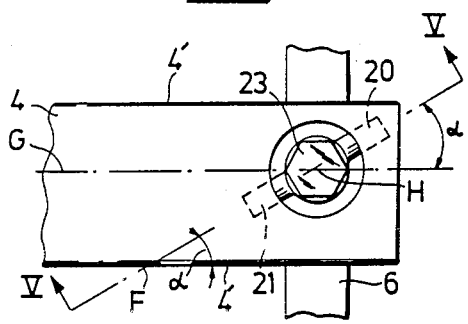
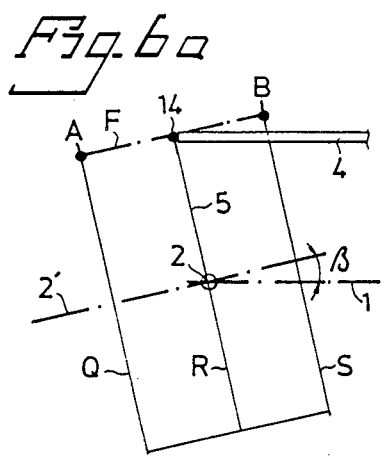
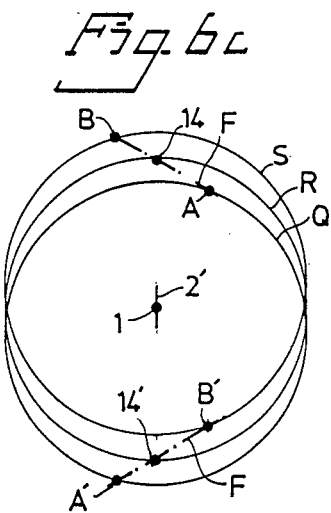
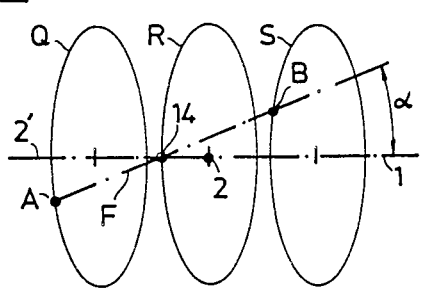
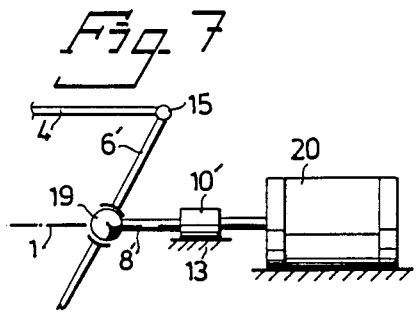

TURBO MACHINE OF THE ROTODYNAMIC TYPE

CROSS REFERENCE TO RELATED APPLICATIONS

This application is a National Phase Application corresponding to PCT/SE 83/00347 filed Oct. 4, 1983 under the Patent Cooperation Treaty and based, in turn, upon an Application 82 05692-0 filed Oct. 6, 1982 in Sweden under the Interational Convention.

FIELD OF THE INVENTION

The invention relates to a turbo machine of the rotodynamic type having a rotor adapted to be traversed by a flow of a medium in a direction to transverse to the axis of rotation, and provided with at least one vane which is pivotally adjustable during operation.

BACKGROUND OF THE INVENTION

Rotodynamic turbo machines are provided in several known constructions such as Voith-Schneider ship propellers, Darrieus and Savonius rotors for wind turbines, the Ossberger or Mitchell turbines for water drive and the so called transverse current or cross flow fan. The Voith-Schneider propellers usually have rotor vanes which can be re-adjusted when rotating.

In a rotor which is traversed by a flow transversally to its rotational axis and which is relatively sparsely fitted with vanes, there must in general exist the possibility to turn ("to angle") the vanes relative to a tangent to their circular path. The character and the degree of the angular adjustment is in every position of the vanes governed by the condition that a line which is normal to the plane in which a vane extends (i.e. to the plane of symmetry of a vane which generally has profiled shape) shall at least approximately pass through a so called control point. In the Darrieus rotor e.g. the control point is located on the rotational axis of the rotor and the vanes have a fixed position, so that these planes always lie tangentially to the circular path of the vanes.

Adjustment of the vanes of a turbine is desirable partly to obtain a sufficiently great starting torque, partly in order to be able to regulate the output effect and/or the number of revolutions as required, and partly in order to be able to avoid overloading when the medium flowing through the rotor has a too great inflow velocity. When transverse flow machines are not used as turbines, but as pumps, fans, agitators and the like, the possibility to re-adjust the vanes enables the capacity to be readily changed as required and with an only insignificant deterioration of efficiency.

OBJECT OF THE INVENTION

It is an object of the present invention to provide a turbo machine of the type stated above, in which the adjustment of the vanes can be performed in a very easy, but at the same time reliable manner, and without the need of complicated devices for transmitting the setting force to a turning rotor.

SUMMARY OF THE INVENTION

A turbine shall have a relatively small diameter in order to obtain high rotational velocity in a generator and, with a given area of through-flow, the rotor, i.e. the vanes, must then have relatively great axial length. Re-adjustment of the vanes in such a rotor is very complicated according to known methods. This drawback is eliminated by the present invention and, among other things, the field of application of transverse current machines with rotors which are relatively sparsely fitted with vanes becomes extended so that even the use of water power is included.

Small water turbines of so called micro size (i.e. having power outputs lower than appr. 100 kW) could up to now not have been built with a reasonable cost for heads of less than appr. 3 meters. According to the invention, such a turbine can be built even for heads in the order of magnitude of 0.5 meters, because the turbine, inspite of the low head, turns at high speed and has in terms of the measuring units "cubic meter per second and meter" so called specific velocities on the order of magnitude of up to appr. 1000 rotations per minute.

According to the invention at least one vane is in at least one pivot point mounted in the rotor so as to be able to pivot about two pivot axes which at least approximately are perpendicular one to another and of which at least one subtends to a control angle between 5° and 85° or between 95° and 175°, and in particular between 30° and 60° or between 120° and 150°, with a plane which comprises the rotational axis of the rotor and the pivot point of the vane.

The rotor can be provided with two terminal or end elements in which the pivotal vane or vanes are mounted at their ends and that both said end elements for adjustment of the position of the vane or vanes can be conformably inclined relative to the rotational axis of the rotor, and at least one of the end elements is connected to a control means for the adjustment of the inclined position.

At least one of the end elements is rigidly connected to a shaft mounted in a bearing which can be pivoted about an axis perpendicular to the rotational axis of the rotor. The other end element is in a pivotal and torque transmitting manner attached to a shaft sub which coincides with the rotational axis of the rotor and which is non-adjustably mounted and defines the output shaft means of the machine.

The length of the rotor can be a multiple of its diameter and at least one support means is disposed between the two end elements and to which the adjustable vanes are pivotally attached. The support means is or are defined by diaphragms which are pervious to water in limited extent or not at all according to a feature of the invention.

Each adjustable vane is connected to the end elements with the aid of a shaft means comprising a central guide ring and pivot shafts attached thereto in radially opposite directions and extending in the plane of the respective vane, and a bolt means which passes through the guide ring and is in radial direction fixed in the end element. The shaft means subtends the aforesaid control angle with the rotational axis of the rotor.

The machine according to the invention is as a rule provided with a rotor in the shape of an elongated cylinder, i.e. a cylinder having greater length than diameter, and the vanes can then suitably be supported, possibly on circular support rings, on several locations along the length of the rotor.

A water turbine according to the invention with a cylindrical rotor is with low heads, thanks to its high rotational speed, superior to a propeller turbine (Kaplan turbine) and is, thanks as well to this high rotational speed, as to its efficiency, also superior to undershot water wheels constructed in accordance with most modern construction principles. The principle of the present invention is, however, in no way limited to application in water turbines, but is suitable for application in all machines of the cross flow type and e.g. particularly suitable to perform in an eminently simple manner the re-adjustment of vanes in a rotor of the Darrieus type, without regard to the diameter/length ratio of such a rotor.

It may be said that the invention is based on space-geometrical relations between the movements performed when a vane is pivoted about an axis and at the same time is positively controlled for rotation about at least one other axis, and at least one of said axes extends obliquely, i.e. neither parallelly nor coaxially, to the axis of rotation of the rotor.

It has been found that when the vanes are pivoted about axes extending obliquely to the rotational axis of the rotor, instead of parallelly therewith, the forces necessary for re-adjustment may be readily transmitted to all vanes even if these, i.e. the whole rotor, are very long. When, however, a pivot axis is parallel to the rotational axis of the rotor, an adjustment mechanism must be provided for each vane at the respective vane support, or torque generating adjustment forces must be transmitted to the long and slender vane profiles.

In contrast thereto, according to the present invention, axially directed adjustment forces are transmitted and re-adjustment of the rotor vanes can be simply achieved by pivoting at least one bearing of the rotor shaft. This implies that a setting means for adjustment of all vanes of a turning rotor can be arranged at a stationary part of the machine. Terminal or end elements of an elongated rotor, or special vane holders provided in a Darrieus rotor, can be ridigly affixed to said shaft mounted in the bearing which is controllable by said setting means. Due to the fact that the rotational axis for the fixation of the vanes in the end elements or vane holders extends obliquely, pivoting said bearing about an axis which is neither coaxial nor parallel with the rotational axis of the rotor results in a change of the position of the vanes relative to the tangent to their circular path, i.e. a change of their pivotal position or "vane angle".

Alternatively, the end elements or vane holders can be pivotally or inclinably arranged on a non-inclinable rotational shaft of the rotor, and adjustment of the vanes is then obtained in conventional manner, i.e. with the aid of hydraulics. It is also possible to mount one of the end elements so as to be inclinable by the setting means via the bearing, and to mount the other end element inclinably on a shaft mounted in a stationary bearing and preferably defining the output shaft of the machine.

BRIEF DESCRIPTION OF THE DRAWING

The invention shall now be explained more in detail with the aid of the enclosed diagrammatic drawing which illustrates exemplary embodiments and in which:

FIG. 1 is a plan view of a cross flow machine in which the present invention may be applied, FIG. 2 is a plan view of a device according to the present invention, FIG. 3 is a perspective view of the arrangement of FIG. 2, FIG. 4 shows to a greater scale a terminal portion of a vane of the device according to FIGS. 2 and 3 in an elevational view, FIG. 5 is a sectional view along the plane V—V in FIG. 4, FIGS. 6a to 6c show in three projections the geometrical quantities which are fundamental for the present invention, and FIG. 7 shows a modified mounting of the rotor.

SPECIFIC DESCRIPTION

Like characters designate corresponding parts throughout the drawings.

Figures 1, 2, 3:
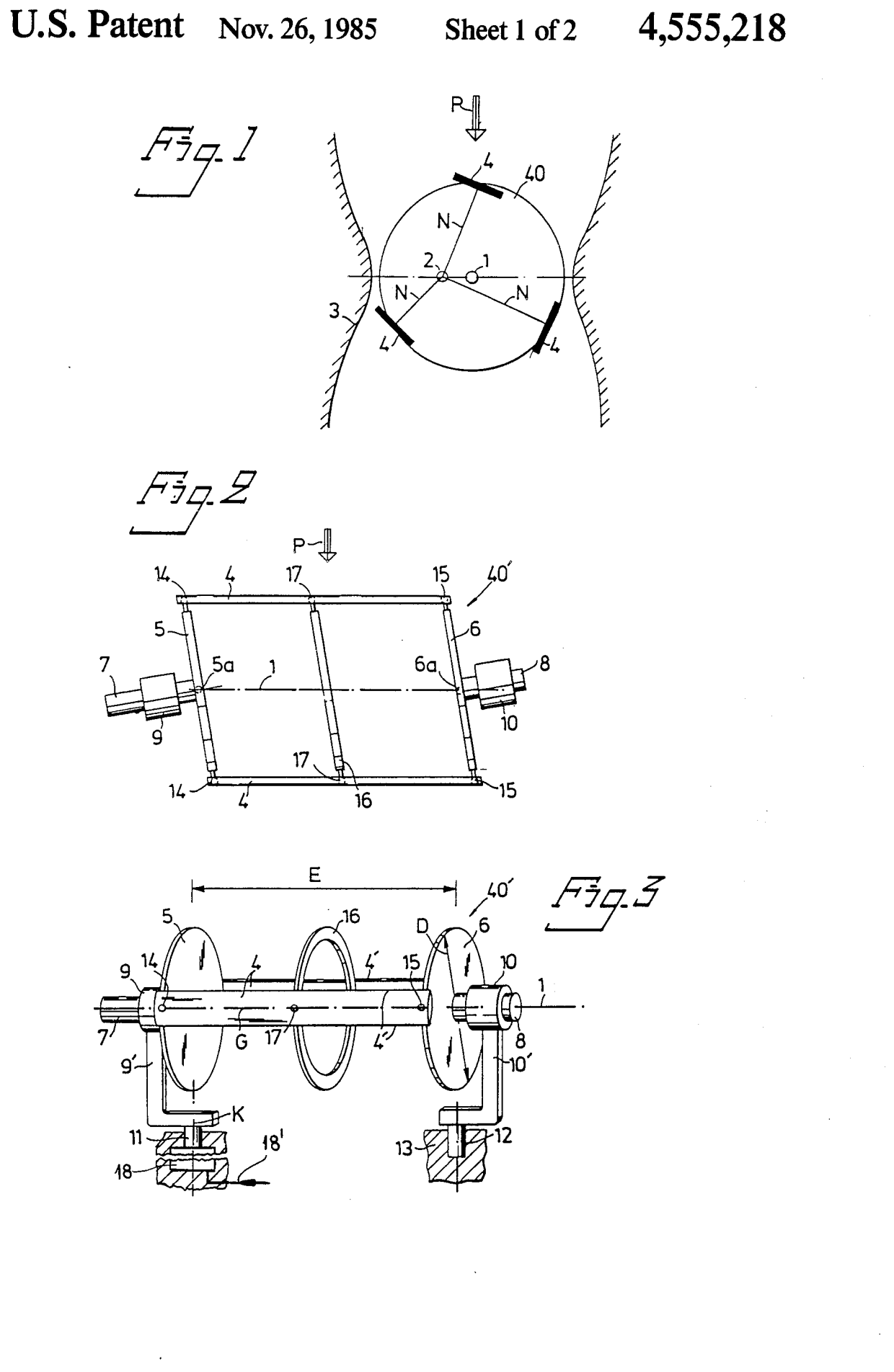

The conventional cross flow machine of FIG. 1 has a rotor 40 which is provided with three elongated vanes 4. The rotor has a rotational axis 1, defined by a material shaft. The above mentioned normals N to the vanes are all directed towards the control point 2, also already mentioned. The inflow direction of a medium traversing the rotor is indicated by the arrow P. The rotor 40 may be located in a surrounding housing 3 or also in a quite free flow field of the medium. In FIG. 1 is diagrammatically shown a cross flow machine which is suited for the application of the present invention, however, without showing the invention itself.

An arrangement according to the invention is shown in the following drawing figures. According to FIGS. 2 and 3, a turbine rotor 40' according to the invention is adapted for rotation about a rotational axis 1, which now, however, is not along its entire length defined by a material shaft made in one piece. The rotor 40' has two terminal or end elements 5, 6, each of which is firmly attached to its own shaft stub 7, 8.

The shaft stubs 7, 8 are rotarily mounted in bearings 9, 10 and each bearing 9, 10 is with the aid of carrier arms 9', 10' and pivot pins 11, 12 pivotally mounted for rotation about an axis K in the stationary part or base 13 of the machine. At least one of the shaft stubs 7, 8 defines the output shaft of the machine wherefrom torque can be taken off, e.g. for a generator. At least one of the pivot pins 11, 12 is connected to a setting means 18 for position adjustment, e.g. a servo-mechanism manoeuvered via a line 18'. In the simpliest case, the setting means can be defined by a manually operable lever attached to the pivot pin.

The vanes 4 (for clarity are shown two vanes, even if as well one vane, or e.g. three vanes as in FIG. 1, or even more, may be provided) are in pivot points with the aid of hinge means 14, 15 pivotally attached to the end elements 5, 6. Longer rotors 40' may be completed with one or several interposed support rings 16 to which the vanes with the aid of hinges 17 also are connected in a pivotal manner. The end elements 5, 6 and/or the support rings 16 may, instead of being discs or rings, also be defined by radially extending arms, each arm carrying at its free end a hinge means. In order to relieve the vanes 4 from any torque, a material shaft may be mounted along the axis 1 and at the locations 5a, 6a (FIG. 2) connected to the end elements 5, 6 with the aid of torque transmitting universal joints (not shown). The length E of the rotor is conveniently selected e.g. twice as long as, and preferably as a still greater multiple of its diameter D.

According to FIGS. 4 and 5, a shaft means 20 to 22 is provided in each vane 4 at the pivot points 14, 15, 17 and comprises two coaxial shaft parts 20, 21 affixed, each from its side, to a guide ring 22. The ring 22 is rotarily mounted on a screw bolt 23 which has an axis H and is in radial direction screwed in the end element 6. Mounting at the end element 5 and possibly at the support ring 16 is identical. The axis F of the shaft means 20 to 22 extends obliquely relative to the rotational axis 1, and this axis 1 is parallel with the longitudinal edges 4' of blade 4 (see also FIG. 3) and subtends a control angle α with a plane comprising the rotational axis 1 and e.g. one of the longitudinal edges 4' or a longitudinal generatrix G of the blade 4 intersecting the axis H of the screw bolt 23. The following relations apply $5° < α < 85°$, $α = 5°$ to $85°$, or and in particular $α = 30°$ to $60°$.

The extreme values 5° and 85° above are applied when it is necessary to obtain a particularly great or particularly small transmission ratio between the inclination of the end elements and the pivotal movement of the vanes.

In a modified embodiment, the pivot axis F may subtend an angle α according to FIG. 4 in the order of magnitude 95° to 175° or 120° to 150°. Moreover, the axis H can be oriented in an arbitrary direction relative to the rotational axis 1 and to the radii to this axis.

The hinges 14, 15, 17 may be, instead of the embodiment shown in FIGS. 4 and 5, embodied by resilient or elastomeric elements such as rubber bushes or torsion bars.

In FIGS. 6a to 6c there are shown the paths along which two points A, B on the axis F travel upon rotation. According to FIG. 6a, these points move along circular paths Q, R, S around the control point 2, more precisely around an axis 2' drawn through this point. In the projection of FIG. 6b can be realised the oblique position of pivot axis F relative to a plane comprising the axes 1 and 2'. In the projection of FIG. 6c the cirucular paths Q, R, S of FIG. 6a appear as ellipses closely approaching circles. The circumstance that the axes 1 and 2' subtend one with another an angle which in FIG. 6a is designated as β implies that in FIG. 6c the paths Q, R, S of the points A and B and of the hinge 14 are displaced relative one to another. The points A and B are points on the axis F in a given rotational position of the rotor 40', and at A' and B' are indicated the positions of these points when the rotor 40' has performed a half turn about the rotational axis 1.

The projection of the axis F, which also represents the plane of the vane 4, shows in FIG. 6c the direction of the vane inclination which in a cross flow machine is desirable and in general also necessary. The peripheral speed of the machine (more correctly of the rotor), the inflow velocity of the medium, and the shape of the blades are preferably selected so that the plane of the vane (as represented by the axis F) at normal load extends tangentially relative to the said circular path, i.e. a circle drawn around the axis 1 and passing through the guide ring 22. Re-adjustment of the vanes is then necessary only at the start (in order to obtain a great start momentum) and when the machine is only partially loaded to obtain good efficiency even then), or, on the other hand, when the machine is overloaded. Thereby are, among other things, avoided those problems which usually arise in so-called full load turbines for water power, viz. erosion downstream the turbine due to unregular water flow.

When the invention is applied in water turbines, the support rings 16 can be made in the form of interposed walls or diaphragms which are pervious to water only in limited extent or not at all, and which divide the rotor longitudinally in several parts, so that water can be allowed to flow only through selected parts of the rotor. A turbine according to the invention may also be combined with a conventional rotor with fixed blades, and both rotors drive then a main shaft with a single generator.

In a practical embodiment of a water turbine according to the invention as shown in FIG. 7, one of the shaft stubs 7, 8, more precisely a stub 8', which defines an output shaft to which a generator 20 is connected, is mounted in a non-adjustable bearing 10'. The other shaft stub is then adjustably mounted in the manner shown in FIG. 3 e.g. on account of the shaft stub 7. The end element 6' of the rotor next to the non-adjustably mounted shaft stub (i.e. on the side of the generator) is in pivotal manner connected to the non-pivotally mounted shaft stub, e.g. with the aid of a torque transmitting spheroidal coupling 19.

We claim:

1. A rotodynamic machine with a rotor comprising:
   at least one elongate vane adapted to orbit an at least approximately circular path about a rotational axis of the rotor;
   respective end pieces operatively engaging said vane and rotatable about respective centers located on said rotational axis;
   means connected with said end pieces for conformably inclining same about inclination axes perpendicular to said rotational axes and adapted to vary the inclination of said end pieces during rotation of said rotor in operation, a medium traversing said rotor through the entire orbit of said vane in a given flow direction generally transverse to said rotational axis and said vane; and
   respective pivot means connecting each of said end pieces to a respective end of said vane, each of said pivot means including:
      means defining a first pivot axis between the respective end piece and said vane and having a fixed relationship to the respective end piece, and
      means defining a second pivot axis between the respective end piece and said vane which lies substantially at a right angle to the respective first pivot axis, is oblique to a longitudinal plane through said vane and includes an angle between substantially 5° and 85° or between substantially 95° and 175° with a longitudinal dimension of said vane, whereby said vane continuously alters its angular orientation with respect to said direction of flow in such manner that in all positions of said vane, a line perpendicular to said plane passes through a control point offset from said rotational axis by an amount determined by the inclination of said end pieces to said rotational axis.

2. The machine defined in claim 1 wherein said first pivot axis is radial with respect to said rotational axis.

3. The machine defined in claim 1 wherein said first pivot axis lies in a plane parallel to the plane of the respective end piece.

4. The machine defined in claim 1 wherein said angle is of the order of 5°.

5. The machine defined in claim 1 wherein said angle is substantially 30° to substantially 50°.

6. The machine defined in claim 1 wherein at least one of said end pieces is rigidly connected to a shifter mounted in a bearing and which can be pivoted about the respective inclination axis.

7. The machine defined in claim 6 wherein the other end element is in a pivoted and torque transmitting connection to a shaft stub which coincides with the rotational axis of the rotor which is nonadjustably mounted, and which defines an output shaft for the machine.

8. The machine defined in claim 1 wherein said rotor has a length which is a multiple of its diameter.

9. The machine defined in claim 1, further comprising support means between said end pieces pivotally engaging said vane.

10. The machine defined in claim 9 wherein said support means includes a diaphragm.

11. The machine defined in claim 1 wherein a plurality of such planes is angularly equispaced about said rotational axis and each of said vanes is pivotally attached to the respective end pieces by respective said pivot means, each of said vanes being connected to the respective end piece, with the aid of a shaft means comprising a central guide ring and pivot shafts attached thereto in radially opposite directions and extending in planes of the respective vanes, and a bolt passing through the guide ring and fixed in radial direction in the respective end piece.

* * * * *